United States Patent
Sundararajan et al.

(10) Patent No.: US 10,484,054 B2
(45) Date of Patent: Nov. 19, 2019

(54) TECHNIQUES AND APPARATUSES FOR PRIORITY-BASED RESOURCE CONFIGURATION

(71) Applicant: QUALCOMM Incorporated, San Diego, CA (US)

(72) Inventors: Jay Kumar Sundararajan, San Diego, CA (US); Wanshi Chen, San Diego, CA (US); Jing Jiang, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/965,494

(22) Filed: Apr. 27, 2018

(65) Prior Publication Data

US 2018/0316395 A1    Nov. 1, 2018

Related U.S. Application Data

(60) Provisional application No. 62/492,735, filed on May 1, 2017.

(51) Int. Cl.
*H04B 7/0413* (2017.01)
*H04W 72/04* (2009.01)
(Continued)

(52) U.S. Cl.
CPC ......... *H04B 7/0413* (2013.01); *H04L 5/0048* (2013.01); *H04L 5/0053* (2013.01);
(Continued)

(58) Field of Classification Search
CPC .. H04B 7/0413; H04W 72/10; H04W 72/042; H04W 4/07; H04L 5/0048; H04L 5/0053
See application file for complete search history.

(56) References Cited

U.S. PATENT DOCUMENTS 8,238,911 B2  8/2012  D'Amore et al.
9,713,030 B2  7/2017  Gao et al.
(Continued)

FOREIGN PATENT DOCUMENTS

WO  WO-2016060524 A1   4/2016
WO  WO-2017117340 A1   7/2017
WO  WO-2018024946 A1 * 2/2018  ............... H04L 1/18

OTHER PUBLICATIONS

Alcatel-Lucent Shanghai Bell, et al., "System Level Consideration and Evaluation for V2V Communication," 3GPP Draft; R1-156978—V2V System Level Consideration and Evaluation, 3rd Generation Partnership Project (3GPP), Mobile Competence Centre; 650, Route Des Lucioles; F-06921 Sophia-Antipolis Cedex; vol. RAN WG1, no. Anaheim, USA; Nov. 15, 2015-Nov. 22, 2015, Nov. 15, 2015, XP051003294, 8 pages, Retrieved from the Internet: URL: http://www.3gpp.org/ftp/Meetings_3GPP_SYNC/RAN1/Docs/ [retrieved on Nov. 15, 2015].
(Continued)

*Primary Examiner* — Dady Chery
(74) *Attorney, Agent, or Firm* — Harrity & Harrity, LLP

(57) ABSTRACT

Certain aspects of the present disclosure generally relate to wireless communication. In some aspects, a UE may receive configuration information that signals a first set of resources and a second set of resources. The configuration information may indicate that the first set of resources is associated with high priority transmissions and the second set of resources is associated with low priority transmissions. The UE may select, based at least in part on the configuration information and a priority of a transmission, either the first set of resources or the second set of resources for transmitting the transmission. The selecting of the first set of resources or the second set of resources may be based on latency requirements or reliability requirements of transmissions to be (Continued)

transmitted by the UE. The UE may transmit the transmission using the selected set of resources. Other aspects are provided.

30 Claims, 15 Drawing Sheets

(51) Int. Cl.
*H04L 5/00* (2006.01)
*H04W 72/10* (2009.01)
*H04W 4/70* (2018.01)

(52) U.S. Cl.
CPC ......... *H04W 72/042* (2013.01); *H04W 72/10* (2013.01); *H04W 4/70* (2018.02)

(56) References Cited

U.S. PATENT DOCUMENTS

| | | | |
|---|---|---|---|
| 2015/0237644 A1* | 8/2015 | Golitschek Edler von Elbwart | H04B 7/2656 370/329 |
| 2017/0201461 A1 | 7/2017 | Cheng et al. | |
| 2017/0230869 A1 | 8/2017 | Kubota et al. | |
| 2017/0230994 A1* | 8/2017 | You | H04W 72/042 |
| 2017/0245295 A1 | 8/2017 | Jung et al. | |
| 2017/0288817 A1* | 10/2017 | Cao | H04L 1/1812 |
| 2017/0332386 A1* | 11/2017 | Li | H04L 1/1812 |
| 2018/0019838 A1* | 1/2018 | Yeo | H04L 1/0036 |
| 2018/0234947 A1* | 8/2018 | Wu | H04W 72/04 |

OTHER PUBLICATIONS

Ericsson: "Considerations on ProSe Group Priority," 3GPP Draft; R1-151763 Prose Group Priority, 3rd Generation Partnership Project (3GPP), Mobile Competence Centre; 650, Route Des Lucioles; F-06921, Sophia-Antipolis Cedex; France, vol. RAN WG1, no. Belgrade, Serbia; Apr. 20, 2015-Apr. 24, 2015, Apr. 19, 2015, XP050934624, 2 pages, Retrieved from the Internet: URL: http://www.3gpp.org/ftp/Meetings_3GPP_SYNC/RAN1/Docs/ [retrieved on Apr. 19, 2015].

Etri: "Resource Pool Handling for Priority Support," 3GPP Draft; R2-152422 Priority Handling-LL, 3rd Generation Partnership Project (3GPP), Mobile Competence Centre; 650, Route Des Lucioles; F-06921, Sophia-Antipolis Cedex; France, vol. RAN WG1, no. Fukuoka, Japan; May 25, 2015-May 29, 2015, May 15, 2015, XP050972207, 2 pages, Retrieved from the Internet: URL: http://www.3gpp.org/ftp/tsg_ran/WG2_RL2/TSGR2_90/Docs/ [retrieved on May 15, 2015].

International Search Report and Written Opinion—PCT/US2018/030221—ISA/EPO—dated Jul. 24, 2018.

* cited by examiner

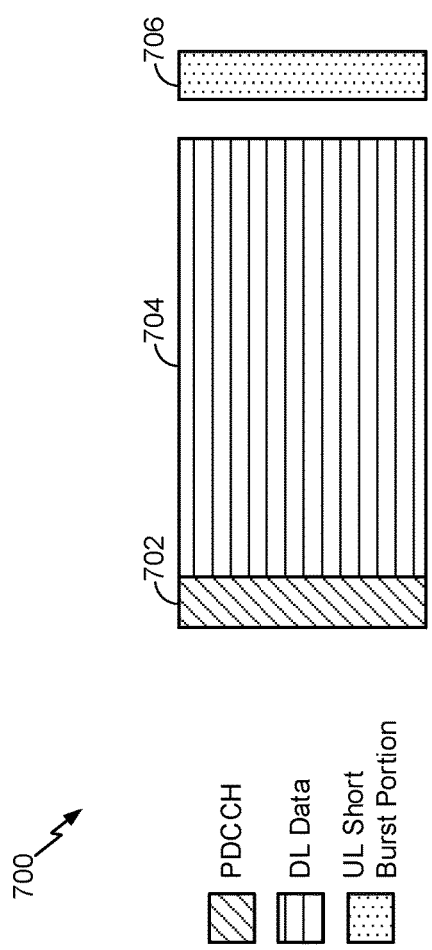
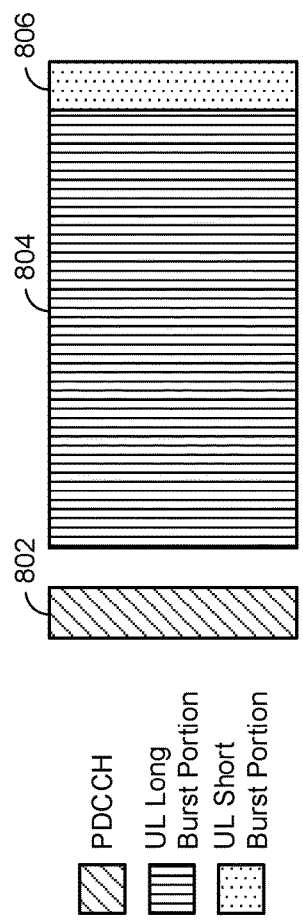
FIG. 7
FIG. 8

TECHNIQUES AND APPARATUSES FOR PRIORITY-BASED RESOURCE CONFIGURATION

CROSS REFERENCE TO RELATED APPLICATION UNDER 35 U.S.C. § 119

This application claims priority to U.S. Provisional Patent Application No. 62/492,735 filed on May 1, 2017 entitled "TECHNIQUES AND APPARATUSES FOR PRIORITY-BASED RESOURCE CONFIGURATION," which is incorporated by reference herein.

FIELD OF THE DISCLOSURE

Aspects of the present disclosure generally relate to wireless communication, and more particularly to techniques and apparatuses for priority-based resource configuration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, Long Term Evolution (LTE), and New Radio (NR).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread ODFM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method for wireless communication performed by a user equipment may include receiving configuration information that signals a first set of resources and a second set of resources, wherein the configuration information indicates that the first set of resources is associated with high priority transmissions and the second set of resources is associated with low priority transmissions; selecting, based at least in part on the configuration information and a priority of a transmission, either the first set of resources or the second set of resources for transmitting the transmission, wherein the selecting of the first set of resources or the second set of resources is based on latency requirements or reliability requirements of transmissions to be transmitted by the user equipment; and transmitting the transmission using the selected set of resources.

In some aspects, a user equipment for wireless communication may include one or more processors configured to receive configuration information that signals a first set of resources and a second set of resources, wherein the configuration information indicates that the first set of resources is associated with high priority transmissions and the second set of resources is associated with low priority transmissions; select, based at least in part on the configuration information and a priority of a transmission, either the first set of resources or the second set of resources for transmitting the transmission, wherein the selecting of the first set of resources or the second set of resources is based on latency requirements or reliability requirements of transmissions to be transmitted by the user equipment; and transmit the transmission using the selected set of resources.

In some aspects, a non-transitory computer-readable medium may store one or more instructions for wireless communication. The one or more instructions, when executed by one or more processors of a user equipment, may cause the one or more processors to receive configuration information that signals a first set of resources and a second set of resources, wherein the configuration information indicates that the first set of resources is associated with high priority transmissions and the second set of resources is associated with low priority transmissions; select, based at least in part on the configuration information and a priority of a transmission, either the first set of resources or the second set of resources for transmitting the transmission, wherein the selecting of the first set of resources or the second set of resources is based on latency requirements or reliability requirements of transmissions to be transmitted by the user equipment; and transmit the transmission using the selected set of resources.

In some aspects, an apparatus for wireless communication may include means for receiving configuration information that signals a first set of resources and a second set of resources, wherein the configuration information indicates that the first set of resources is associated with high priority transmissions and the second set of resources is associated with low priority transmissions; means for selecting, based at least in part on the configuration information and a priority of a transmission, either the first set of resources or the second set of resources for transmitting the transmission, wherein the selecting of the first set of resources or the second set of resources is based on latency requirements or reliability requirements of transmissions to be transmitted by the apparatus; and means for transmitting the transmission using the selected set of resources.

In some aspects, a method for wireless communication performed by a user equipment may include receiving configuration information that signals a first set of resources and a second set of resources, wherein the configuration information indicates that the first set of resources is associated with high priority transmissions and that the second set of resources is associated with low priority transmissions; and monitoring the first set of resources and/or the second set of resources for transmissions, wherein a transmission on the first set of resources is a higher priority transmission than a transmission on the second set of resources.

In some aspects, a user equipment for wireless communication may include one or more processors configured to receive configuration information that signals a first set of resources and a second set of resources, wherein the configuration information indicates that the first set of resources is associated with high priority transmissions and that the second set of resources is associated with low priority transmissions; and monitor the first set of resources and/or the second set of resources for transmissions, wherein a transmission on the first set of resources is a higher priority transmission than a transmission on the second set of resources.

In some aspects, a non-transitory computer-readable medium may store one or more instructions for wireless communication. The one or more instructions, when executed by one or more processors of a user equipment, may cause the one or more processors to receive configuration information that signals a first set of resources and a second set of resources, wherein the configuration information indicates that the first set of resources is associated with high priority transmissions and that the second set of resources is associated with low priority transmissions; and monitor the first set of resources and/or the second set of resources for transmissions, wherein a transmission on the first set of resources is a higher priority transmission than a transmission on the second set of resources.

In some aspects, an apparatus for wireless communication may include means for receiving configuration information that signals a first set of resources and a second set of resources, wherein the configuration information indicates that the first set of resources is associated with high priority transmissions and that the second set of resources is associated with low priority transmissions; and means for monitoring the first set of resources and/or the second set of resources for transmissions, wherein a transmission on the first set of resources is a higher priority transmission than a transmission on the second set of resources.

In some aspects, a method for wireless communication performed by a user equipment may include receiving configuration information that signals a first set of uplink (UL) resources and a second set of UL resources for uplink transmissions, and a first set of downlink (DL) resources and a second set of DL resources for downlink transmissions, wherein the configuration information indicates that the first set of UL resources and the first set of DL resources are associated with high priority transmissions and that the second set of UL resources and the second set of DL resources are associated with low priority transmissions; selectively transmitting, based at least in part on the configuration information and a priority of an uplink transmission, the uplink transmission using the first set of UL resources or the second set of UL resources; and monitoring, based at least in part on the configuration information, the first set of DL resources and/or the second set of DL resources for a downlink transmission.

In some aspects, a user equipment for wireless communication may include one or more processors configured to receive configuration information that signals a first set of UL resources and a second set of UL resources for uplink transmissions, and a first set of DL resources and a second set of DL resources for downlink transmissions, wherein the configuration information indicates that the first set of UL resources and the first set of DL resources are associated with high priority transmissions and that the second set of UL resources and the second set of DL resources are associated with low priority transmissions; selectively transmit, based at least in part on the configuration information and a priority of an uplink transmission, the uplink transmission using the first set of UL resources or the second set of UL resources; and monitor, based at least in part on the configuration information, the first set of DL resources and/or the second set of DL resources for a downlink transmission.

In some aspects, a non-transitory computer-readable medium may store one or more instructions for wireless communication. The one or more instructions, when executed by one or more processors of a user equipment, may cause the one or more processors to receive configuration information that signals a first set of UL resources and a second set of UL resources for uplink transmissions, and a first set of DL resources and a second set of DL resources for downlink transmissions, wherein the configuration information indicates that the first set of UL resources and the first set of DL resources are associated with high priority transmissions and that the second set of UL resources and the second set of DL resources are associated with low priority transmissions; selectively transmit, based at least in part on the configuration information and a priority of an uplink transmission, the uplink transmission using the first set of UL resources or the second set of UL resources; and monitor, based at least in part on the configuration information, the first set of DL resources and/or the second set of DL resources for a downlink transmission.

In some aspects, an apparatus for wireless communication may include means for receiving configuration information that signals a first set of UL resources and a second set of UL resources for uplink transmissions, and a first set of DL resources and a second set of DL resources for downlink transmissions, wherein the configuration information indicates that the first set of UL resources and the first set of DL resources are associated with high priority transmissions and that the second set of UL resources and the second set of DL resources are associated with low priority transmissions; means for selectively transmitting, based at least in part on the configuration information and a priority of an uplink transmission, the uplink transmission using the first set of UL resources or the second set of UL resources; and means for monitoring, based at least in part on the configuration information, the first set of DL resources and/or the second set of DL resources for a downlink transmission.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7 is a diagram illustrating an example of a downlink (DL)-centric subframe, in accordance with certain aspects of the present disclosure.

FIG. 8 is a diagram illustrating an example of an uplink (UL)-centric subframe, in accordance with certain aspects of the present disclosure.

DETAILED DESCRIPTION

Figure 1:
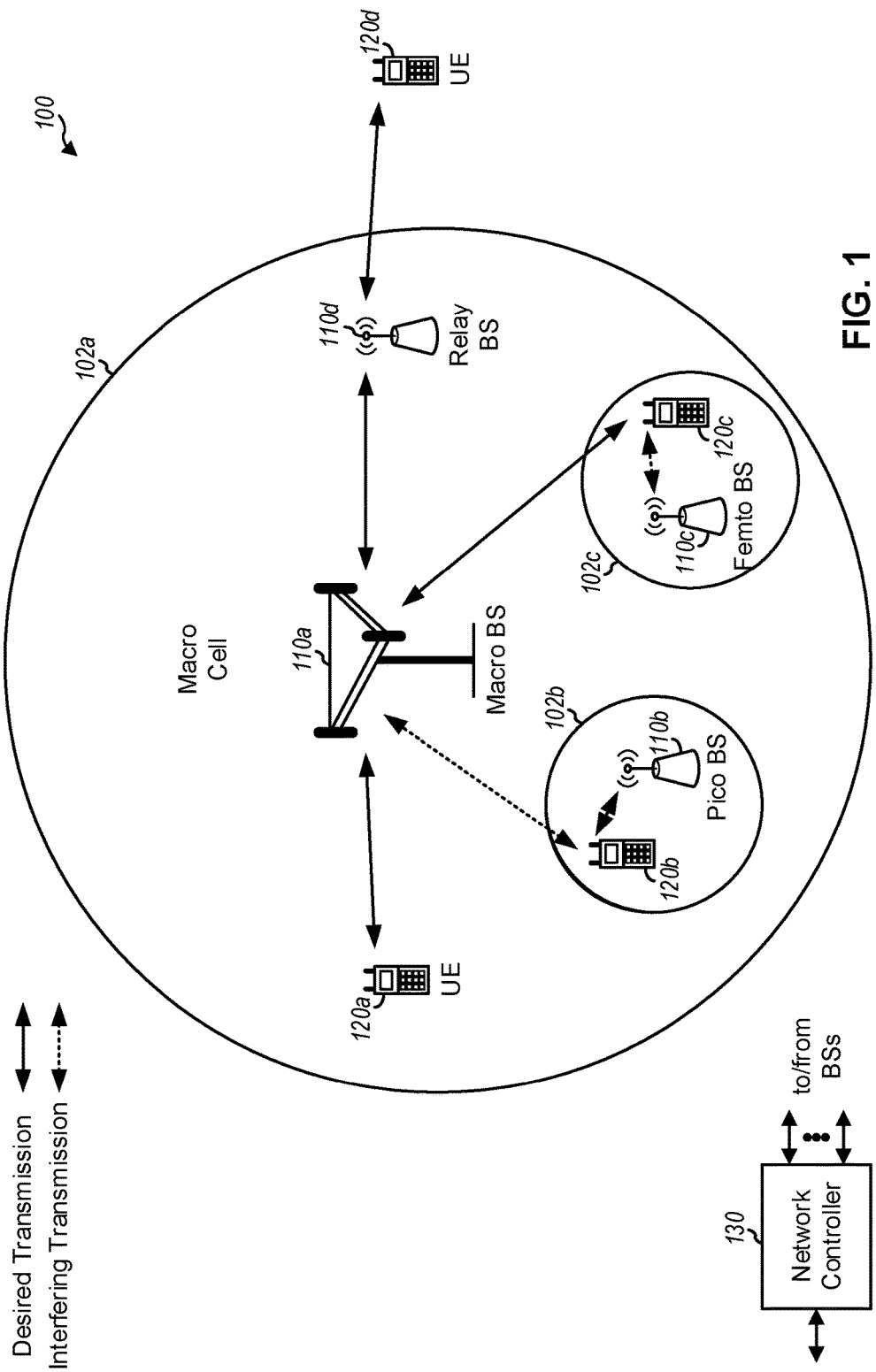
FIG. 1 is a block diagram conceptually illustrating an example of a wireless communication network, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over another aspect. Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

An access point ("AP") may comprise, be implemented as, or known as NodeB, Radio Network Controller ("RNC"), eNodeB (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), Node B (NB), gNB, 5G NB, NR BS, Transmit Receive Point (TRP), or some other terminology.

An access terminal ("AT") may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some aspects, an access terminal may comprise a cellular telephone, a smart phone, a cordless telephone, a Session Initiation Protocol ("SIP") phone, a wireless local loop ("WLL") station, a personal digital assistant ("PDA"), a tablet, a netbook, a smartbook, an ultrabook, a handheld device having wireless connection capability, a Station ("STA"), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), wearable device (e.g., smart watch, smart glasses, smart bracelet, smart wristband, smart ring, smart clothing, etc.), medical devices or equipment, biometric sensors/devices, an entertainment device (e.g., music device, video device, satellite radio, gaming device, etc.), a vehicular component or sensor, smart meters/sensors, industrial manufacturing equipment, a global positioning system device, or any other suitable device that is configured to communicate via a wireless or wired medium. In some aspects, the node is a wireless node. A wireless node may provide, for example, connectivity for or to a network (e.g., a wide area network such as the Internet or a cellular network) via a wired or wireless communication link. Some UEs may be considered machine-type communication (MTC) UEs, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Examples of MTC devices include sensors, meters, location tags, monitors, drones, robots/robotic devices, etc. MTC UEs, as well as other types of UEs, may be implemented as NB-IoT (narrowband internet of things) devices.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be a 5G or NR network or some other wireless network, such as an LTE network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G NB, an access point, a TRP, etc. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. Some UEs may be considered a Customer Premises Equipment (CPE). UE 120 may be included inside a housing 120' that houses components of UE 120, such as processor components, memory components, and/or the like.

In FIG. 1, a solid line with double arrows indicates desired transmissions between a UE and a serving BS, which is a BS designated to serve the UE on the downlink and/or uplink. A dashed line with double arrows indicates potentially interfering transmissions between a UE and a BS.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
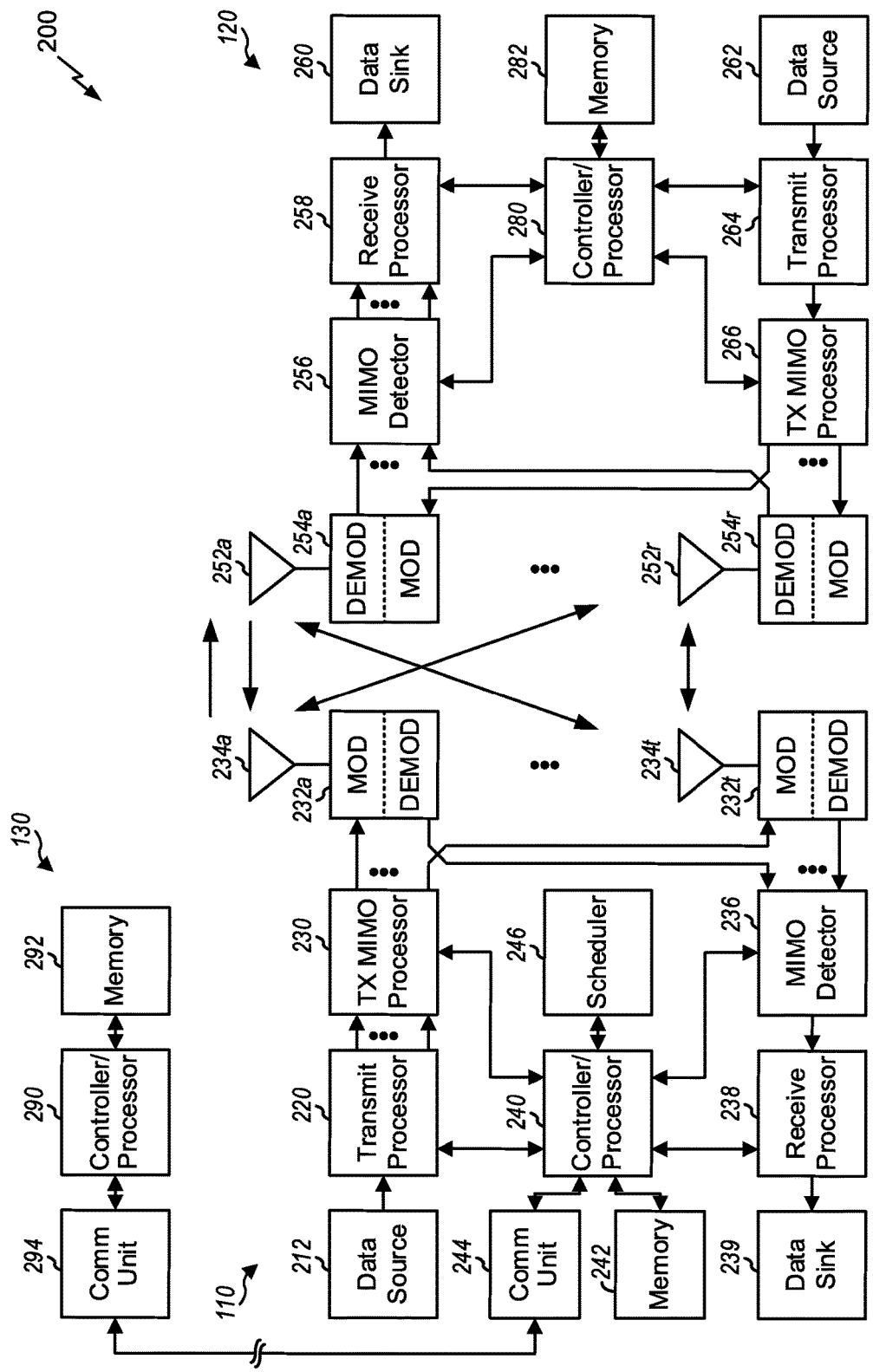
FIG. 2 shows a block diagram conceptually illustrating an example of a base station in communication with a user equipment (UE) in a wireless communication network, in accordance with certain aspects of the present disclosure.

FIG. 2 shows a block diagram of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the CRS) and synchronization signals (e.g., the primary synchronization signal (PSS), the secondary synchronization signal (SSS), the tertiary synchronization signal (TSS), and/or the like). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controllers/processors 240 and 280 and/or any other component(s) in FIG. 2 may direct the operation at base station 110 and UE 120, respectively, to perform operations associated with priority-based resource configuration, respectively, as described herein. For example, controller/processor 280 and/or other processors and modules at UE 120, may perform or direct operations of UE 120 to perform one or more operations associated with priority-based resource configuration. For example, controller/processor 280 and/or other controllers/processors and modules at UE 120 may perform or direct operations of, for example, process 1000 of FIG. 10, process 1200 of FIG. 12, process 1300 of FIG. 13, and/or other processes as described herein. In some aspects, one or more of the components shown in FIG. 2 may be employed to perform example process 1000, example process 1200, example process 1300, and/or other processes for the techniques described herein. Memories 242 and 282 may store data and program codes for base station 110 and UE 120, respectively. A scheduler 246 may schedule UEs for data transmission on the downlink and/or uplink.

As indicated above, FIG. 2 is provided merely as an example. Other examples are possible and may differ from what was described with regard to FIG. 2.

Figure 3:
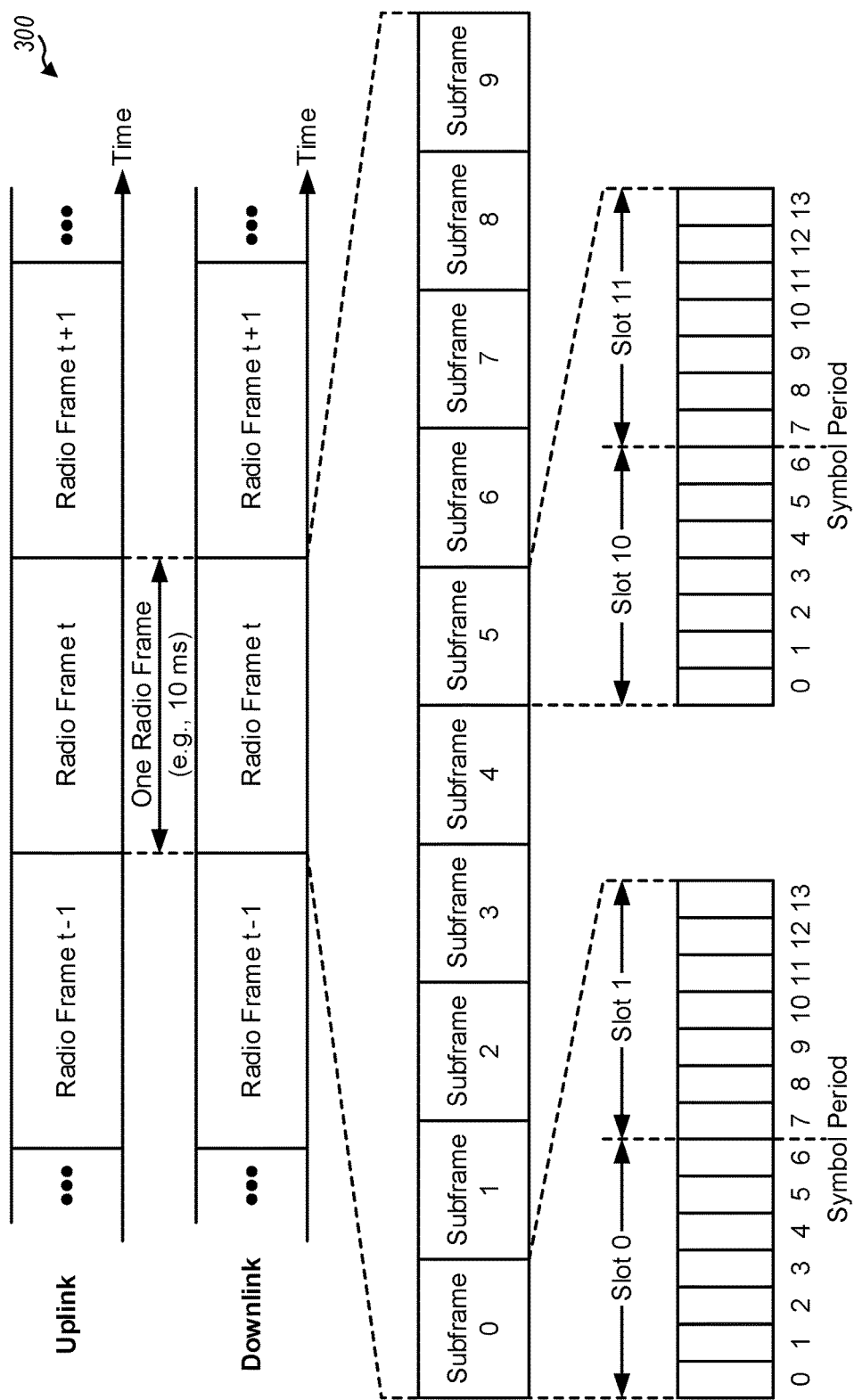
FIG. 3 is a block diagram conceptually illustrating an example of a frame structure in a wireless communication network, in accordance with certain aspects of the present disclosure.

FIG. 3 shows an example frame structure 300 for FDD in a telecommunications system (e.g., NR). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L-1.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol.

In certain telecommunications (e.g., NR), a BS may transmit a primary synchronization signal (PSS), a secondary synchronization signal (SSS), and tertiary synchronization signal (TSS) on the downlink for each cell supported by the BS. The PSS and SSS may be used by UEs for cell search and acquisition. For example, the PSS may be used by UEs to determine symbol timing, and the SSS may be used by UEs to determine a physical cell identifier, associated with the BS, and frame timing. A TSS may be used by UEs to identify a beam associated with the PSS and/or the SSS. For example, in a case where the BS and a UE communicate using a multi-beam communication technique (e.g., whereby the BS communicates with the UE via multiple beams), the BS may transmit a TSS that may be used by the UE to identify the beam associated with the PSS and/or the SSS. The BS may also transmit a physical broadcast channel (PBCH). The PBCH may carry some system information, such as system information that supports initial access by UEs.

The BS may transmit other system information such as system information blocks (SIBs) on a physical downlink shared channel (PDSCH) in certain subframes. The BS may transmit control information/data on a physical downlink control channel (PDCCH) in B symbol periods of a subframe, where B may be configurable for each subframe. The BS may transmit traffic data and/or other data on the PDSCH in the remaining symbol periods of each subframe.

As indicated above, FIG. 3 is provided merely as an example. Other examples are possible and may differ from what was described with regard to FIG. 3.

Figure 4:
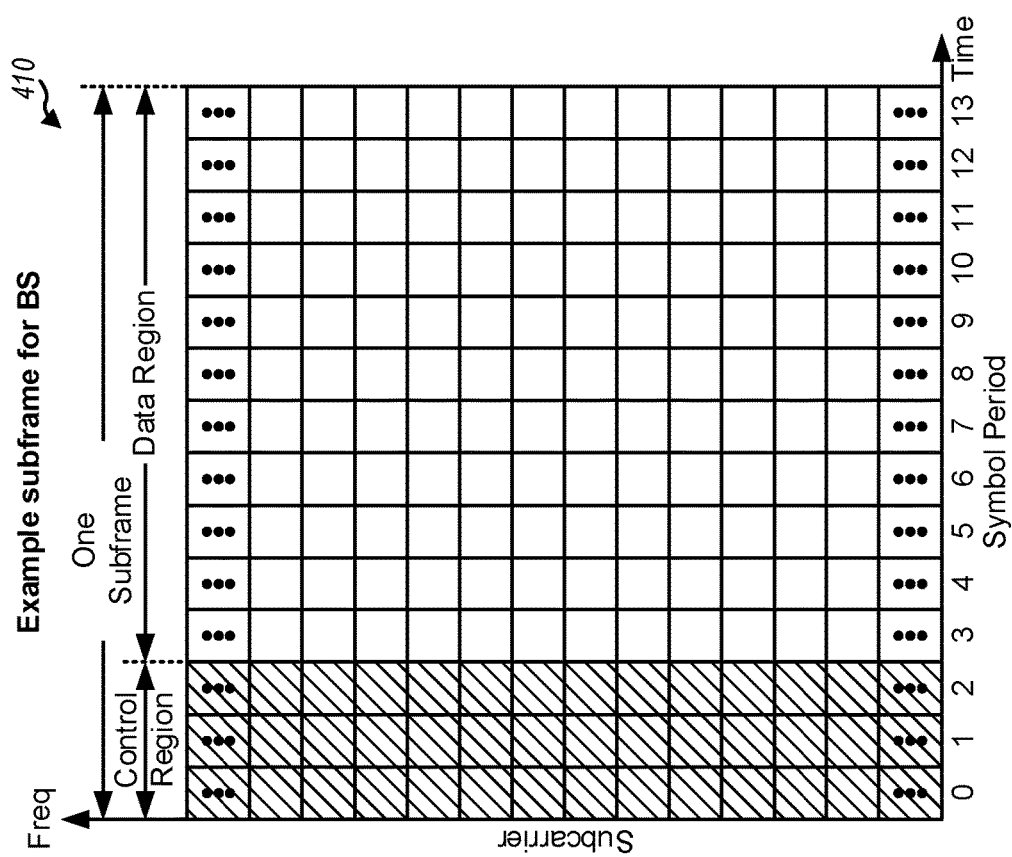
FIG. 4 is a block diagram conceptually illustrating an example subframe format with the normal cyclic prefix, in accordance with certain aspects of the present disclosure.

FIG. 4 shows an example subframe format 410 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems.

New radio (NR) may refer to radios configured to operate according to a new air interface or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data. UL and DL subframes for NR may be as described in more detail below with respect to FIGS. 7 and 8.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. NR BSs may transmit downlink signals to UEs indicating the cell type. Based at least in part on the cell type indication, the UE may communicate with the NR BS. For example, the UE may determine NR BSs to consider for cell selection, access, handover, and/or measurement based at least in part on the indicated cell type.

As indicated above, FIG. 4 is provided merely as an example. Other examples are possible and may differ from what was described with regard to FIG. 4.

Figure 5:
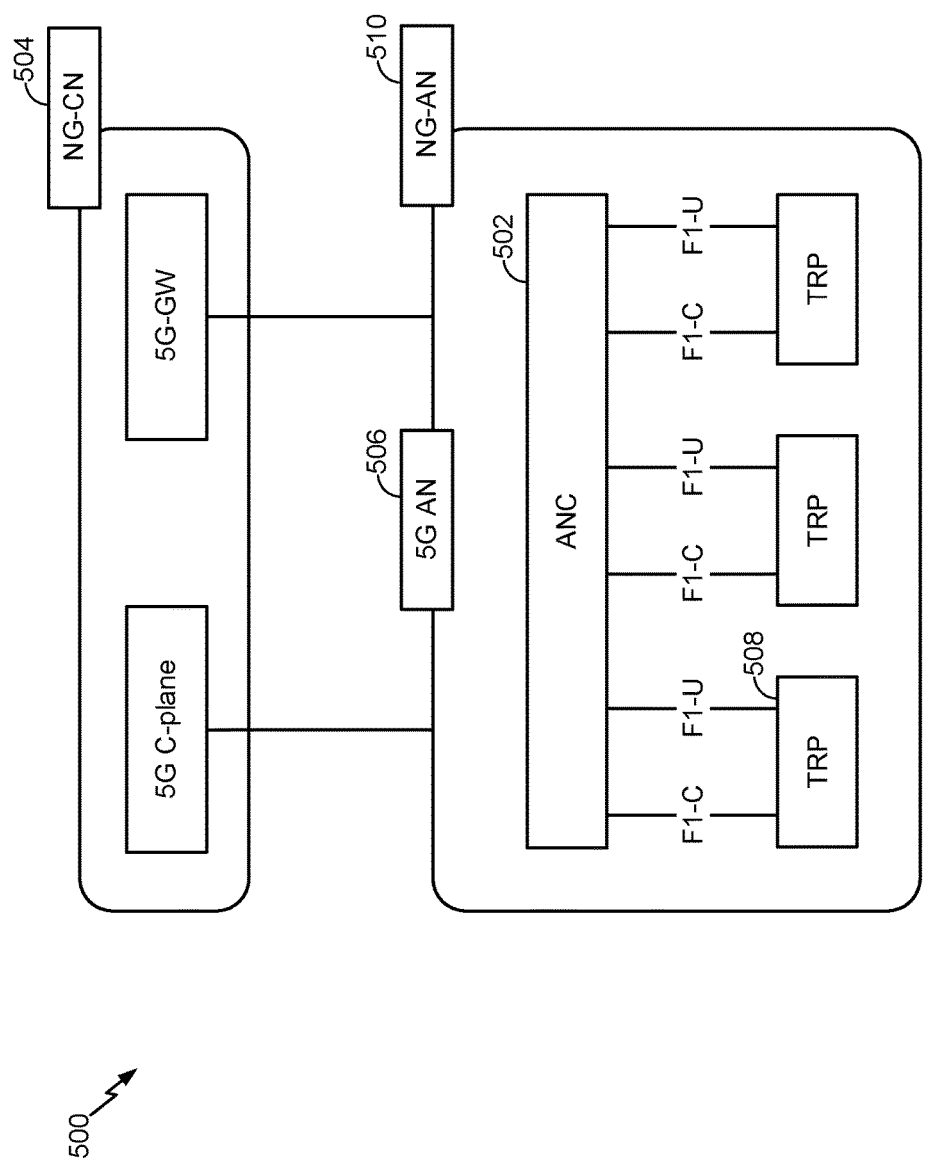
FIG. 5 illustrates an example logical architecture of a distributed radio access network (RAN), in accordance with certain aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The PDCP, RLC, MAC protocol may be adaptably placed at the ANC or TRP.

According to certain aspects, a BS may include a central unit (CU) (e.g., ANC 502) and/or one or more distributed units (e.g., one or more TRPs 508).

As indicated above, FIG. 5 is provided merely as an example. Other examples are possible and may differ from what was described with regard to FIG. 5.

Figure 6:
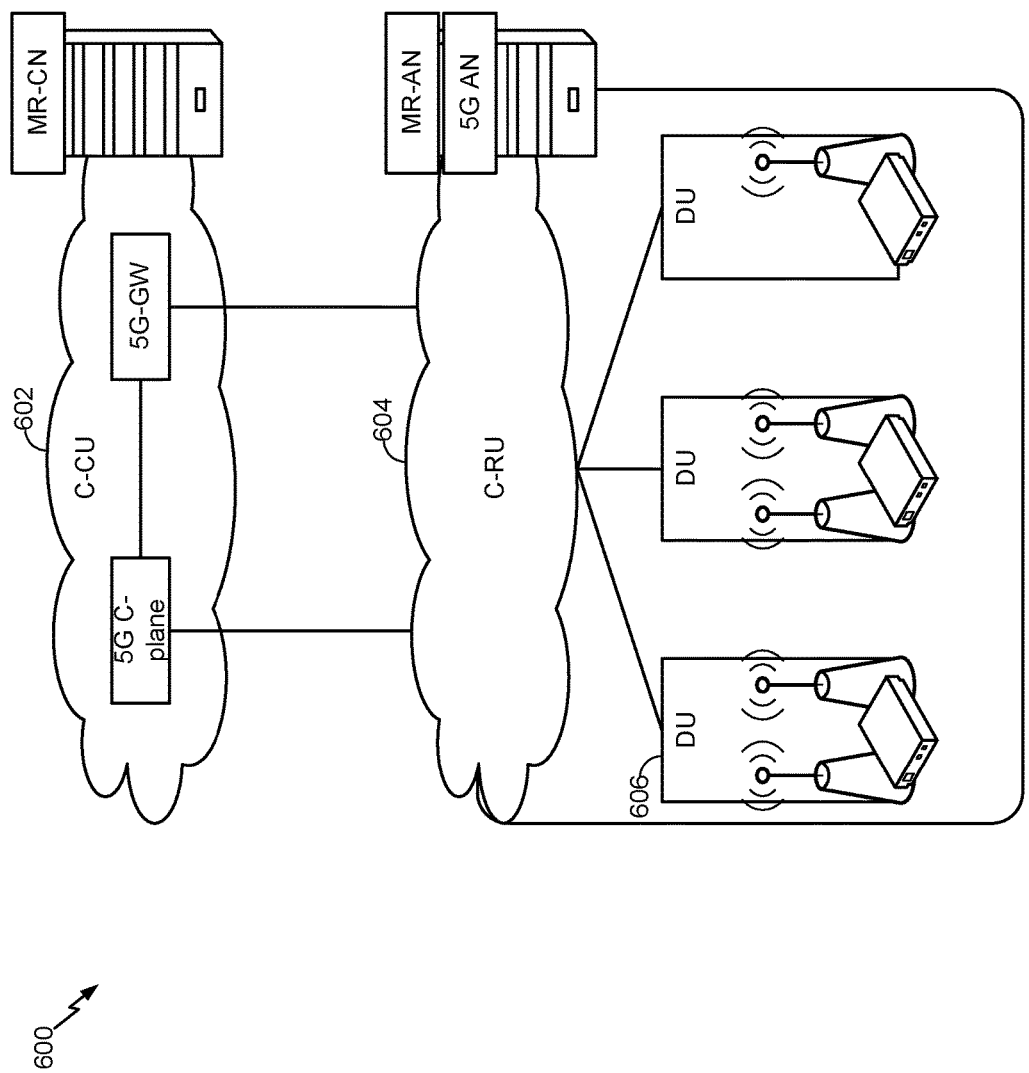
FIG. 6 illustrates an example physical architecture of a distributed RAN, in accordance with certain aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples are possible and may differ from what was described with regard to FIG. 6.

FIG. 7 is a diagram 700 showing an example of a DL-centric subframe or wireless communication structure. The DL-centric subframe may include a control portion 702. The control portion 702 may exist in the initial or beginning portion of the DL-centric subframe. The control portion 702 may include various scheduling information and/or control information corresponding to various portions of the DL-centric subframe. In some configurations, the control portion 702 may be a physical DL control channel (PDCCH), as indicated in FIG. 7. In some aspects, the control portion 702 may include legacy PDCCH information, shortened PDCCH (sPDCCH) information), a control format indicator (CFI) value (e.g., carried on a physical control format indicator channel (PCFICH)), one or more grants (e.g., downlink grants, uplink grants, etc.), and/or the like.

The DL-centric subframe may also include a DL data portion 704. The DL data portion 704 may sometimes be referred to as the payload of the DL-centric subframe. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PDSCH).

The DL-centric subframe may also include an UL short burst portion 706. The UL short burst portion 706 may sometimes be referred to as an UL burst, an UL burst portion, a common UL burst, a short burst, an UL short burst, a common UL short burst, a common UL short burst portion, and/or various other suitable terms. In some aspects, the UL short burst portion 706 may include one or more reference signals. Additionally, or alternatively, the UL short burst portion 706 may include feedback information corresponding to various other portions of the DL-centric subframe. For example, the UL short burst portion 706 may include feedback information corresponding to the control portion 702 and/or the data portion 704. Non-limiting examples of information that may be included in the UL short burst portion 706 include an ACK signal (e.g., a PUCCH ACK, a PUSCH ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 706 may include additional or alternative information, such as information pertaining to random access channel (RACH) procedures, scheduling requests, and various other suitable types of information.

As illustrated in FIG. 7, the end of the DL data portion 704 may be separated in time from the beginning of the UL short burst portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 7 is provided merely as an example. Other examples are possible and may differ from what was described with regard to FIG. 7.

FIG. 8 is a diagram 800 showing an example of an UL-centric subframe or wireless communication structure. The UL-centric subframe may include a control portion 802. The control portion 802 may exist in the initial or beginning portion of the UL-centric subframe. The control portion 802 in FIG. 8 may be similar to the control portion 702 described above with reference to FIG. 7. The UL-centric subframe may also include an UL long burst portion 804. The UL long burst portion 804 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 802 may be a physical DL control channel (PDCCH).

As illustrated in FIG. 8, the end of the control portion 802 may be separated in time from the beginning of the UL long burst portion 804. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric subframe may also include an UL short burst portion 806. The UL short burst portion 806 in FIG. 8 may be similar to the UL short burst portion 706 described above with reference to FIG. 7, and may include any of the information described above in connection with FIG. 7. The foregoing is merely one example of an UL-centric wireless communication structure, and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In one example, a wireless communication structure, such as a frame, may include both UL-centric subframes and DL-centric subframes. In this example, the ratio of UL-centric subframes to DL-centric subframes in a frame may be dynamically adjusted based at least in part on the amount of UL data and the amount of DL data that are transmitted. For example, if there is more UL data, then the ratio of UL-centric subframes to DL-centric subframes may be increased. Conversely, if there is more DL data, then the ratio of UL-centric subframes to DL-centric subframes may be decreased.

As indicated above, FIG. 8 is provided merely as an example. Other examples are possible and may differ from what was described with regard to FIG. 8.

According to a wireless communication standard, such as NR, different types of services may be supported by a wireless communication network. For example, in NR, an Enhanced Mobile Broadband (eMBB) service, an ultra-reliable low-latency (URLLC) service, and/or one or more other types of service, may be supported by a wireless communication network. In such a case, the different services may be supported by, for example, multiplexing transmissions, associated with the different services, in a same set of resources (e.g., in a same slot).

These different services may be associated with different priorities. For example, a URLLC transmission may have a higher priority than an eMBB transmission (e.g., since a latency requirement associated with the URLLC transmission may be more stringent than a latency requirement associated with the eMBB transmission). Furthermore, even within a particular type of service, a first transmission may have a different priority than a second transmission based at least in part on dynamic attributes associated with the first and second transmissions. For example, a first URLLC transmission may have a higher priority than a second URLLC transmission when a time remaining until a deadline, associated with the first URLLC transmission, is less than a time remaining until a deadline associated with the second URLLC transmission. Thus, in order to support such priority-based services such that service requirements are reliably satisfied, different resources may be allocated and used (e.g., selected by a UE for a transmission in the uplink direction or monitored by the UE for a transmission in the downlink direction) in a manner that is cognizant of transmission priorities. Techniques associated with prior wireless communications standards (e.g., LTE, WiFi, and/or the like) may not be sufficiently dynamic, and may rely on partitioning resources based on priority, which may result in network inefficiency.

Some aspects described herein provide techniques and apparatuses for allocating and using different sets of resources for transmissions of differing priorities such that service requirements (e.g., associated with a particular service, associated with a particular transmission, and/or the like) are reliably satisfied. For example, different sets of resources, capable of providing different qualities of service, may be allocated and used for transmissions of differing priorities, thereby allowing service requirements, associated with the transmissions, to be reliably satisfied.

As a particular example, in the uplink direction, a first set of resources, capable of providing a relatively higher quality of service (e.g., resources with greater reliability, lower utilization, and/or the like), may be selected for transmitting a high priority transmission (e.g., URLLC transmission), while a second set of resources, capable of providing a relatively lower quality of service (e.g., resources with less reliability, higher utilization, and/or the like), may be selected for transmitting a low priority transmission (e.g., eMBB transmission). As another example, in the downlink direction, a first set of resources, capable of providing a relatively higher quality of service, and a second set of resources, capable of providing a relatively lower quality of service, may be monitored for high priority transmissions and low priority transmissions, respectively. In some aspects, the allocation and/or use of a given set of resources may be based at least in part on, for example, a type of service associated with a transmission, a priority associated with the transmission, an urgency of the transmission, and/or the like.

In some aspects, the dynamic allocation and/or use of the different sets of resources (e.g., capable of providing different qualities of service) may allow for short-term and/or sudden changes in transmission priority (e.g., due to traffic variations, link variations, and/or the like) to be accounted for, thereby improving overall efficiency of the wireless communication network (e.g., as compared to a static allocation of resources).

FIGS. 9A-9D are diagrams associated with an example 900 of UE 120 selecting a first set of resources, associated with high priority transmissions, or a second set of resources, associated with low priority transmissions, and transmitting an UL transmission (e.g., an eMBB transmission, a URLLC transmission, and/or the like) using the selected set of resources, in accordance with various aspects of the present disclosure.

Figure 9A:
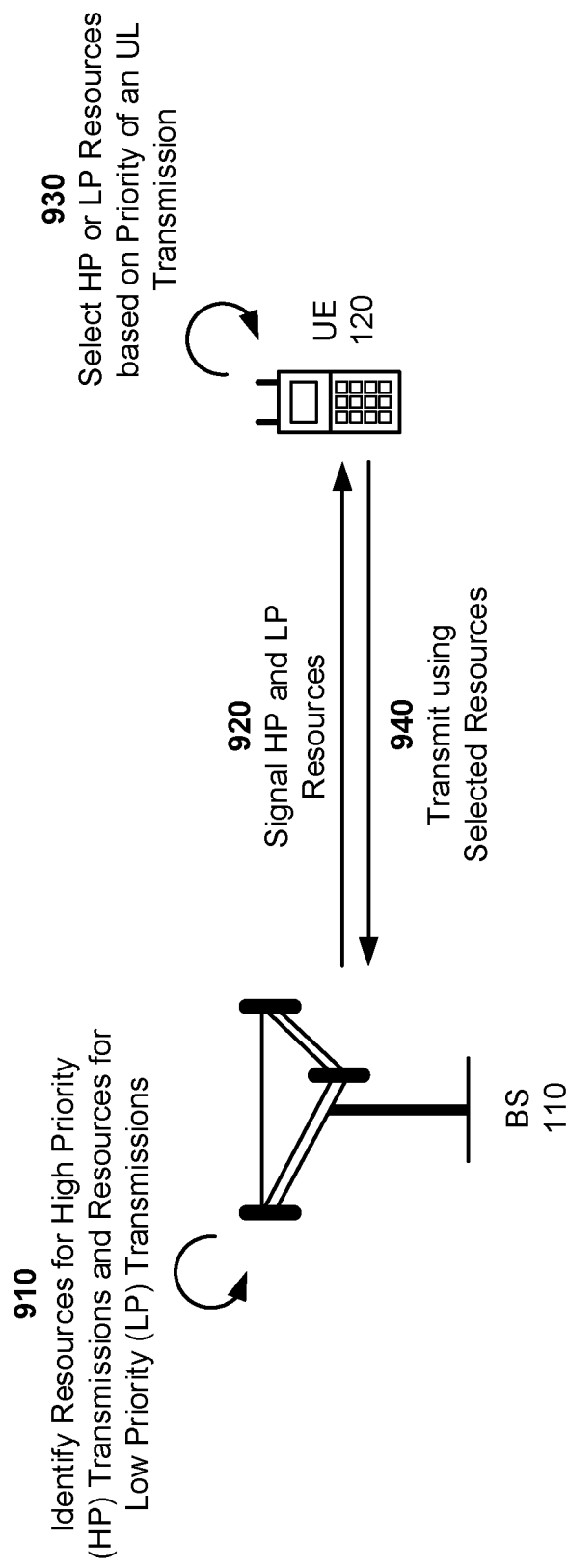
FIGS. 9A-9D are diagrams associated with an example of a UE selecting a first set of resources, associated with high priority transmissions, or a second set of resources, associated with low priority transmissions, and transmitting a transmission using the selected set of resources, in accordance with various aspects of the present disclosure.

As shown in FIG. 9A, and by reference number 910, BS 110 may identify a first set of resources, associated with high priority transmissions, and a second set of resources associated with low priority transmissions. A set of resources may include resources that may be used (e.g., by UE 120) for transmitting UL transmissions or receiving DL transmissions. For example, the set of resources may include a set of resource blocks, a set of slots, a set of symbols (e.g., in one or more slots), a transmit power level, a spreading code used for code-division multiple access (CDMA), a MIMO spatial layer, a beam, or a port, or any combination thereof, that may be used for transmitting UL transmissions or receiving DL transmissions.

In some aspects, BS 110 may identify the first set of resources as being associated with (i.e., to be used for) high priority transmissions and the second set of resources as being associated with low priority transmissions based at least in part on controlling a quality of the sets of resources. For example, BS 110 may be configured to limit access to the first set of resources as compared to the second set of resources (e.g., such that a number of transmissions that use the first set of resources is less than a number transmissions that use the second set of resources). Here, limiting access to the first set of resources may cause the first set of resources to provide a higher quality of service than that provided by the second set of resources (e.g., since the loading level of the first set of resources will be lower than that of the second set of resources). In this example, BS 110 may identify the first set of resources as being associated with high priority transmissions and the second set of resources as being associated with low priority transmissions.

Additionally, or alternatively, BS 110 may identify the first set of resources as being associated with high priority transmissions and the second set of resources as being associated with low priority transmissions by utilizing a power control technique. For example, BS 110 may configure UE 120 to use a first power control target set point when transmitting using a particular set of resources and to use a second power control target set point when transmitting using another set of resources, where the first power control target set point is higher than the second power control target set point. Here, a transmission using the first set of resources, at the first power control target set point, may have an improved SINR as compared to a transmission using the second set of resources at the second power control target set point. As such, a quality of service, provided by the first set of resources, may be higher than that of the second set of resources. In this example, BS 110 may identify the first set of resources as being associated with high priority transmissions and the second set of resources as being associated with low priority transmissions.

Additionally, or alternatively, BS 110 may identify the first set of resources as being associated with high priority transmissions and the second set of resources as being associated with low priority transmissions based at least in part on coordination among cells associated with BS 110 (e.g., neighbor cells). For example, BS 110 may coordinate with other cells (e.g., of BS 110 or another BS 110) such that a particular frequency band, or a portion thereof, is used within each of the cells for high priority transmissions only. In this example, such coordination may reduce inter-cell interference on the particular frequency band, thereby improving the quality of service provided on the frequency band. Here, BS 110 may identify the first set of resources as one that uses the particular frequency band, and may identify the second set of resources as one that uses another frequency band (e.g., a frequency band for which no coordination is maintained, a frequency band for which coordination as use for low priority transmissions is maintained, and/or the like).

Figure 9B:
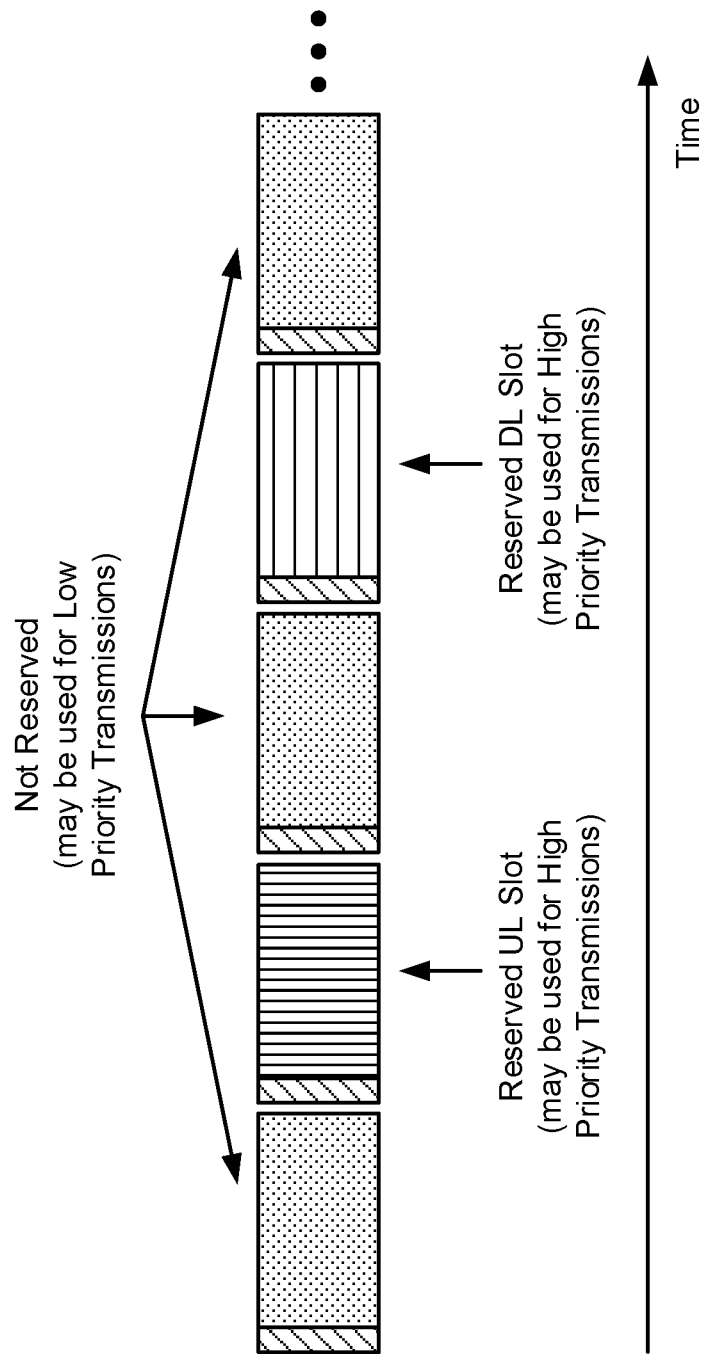

Additionally, or alternatively, BS 110 may identify the first set of resources as being associated with high priority transmissions and the second set of resources as being associated with low priority transmissions based at least in part on a reservation, among multiple cells, of a slot, including the first set of resources, as a slot used for transmissions in a particular direction. For example, BS 110 may coordinate with other cells such that a particular slot is to be used for transmissions in only one direction (e.g., DL or UL). Such slot reservation may reduce cross-link interference among the multiple cells (e.g., since transmission will be in only one direction), thereby improving quality of service provided in the slot. FIG. 9B is a diagram illustrating an example of a manner in which such slot reservation may be achieved. In FIG. 9B, the second slot is reserved for transmissions in the UL direction, while the fourth slot is reserved for transmissions in the DL direction. The first, third, and fifth slots are not reserved for transmission in a particular direction. As noted, the second and fourth slots may be used for high priority UL and DL transmissions (without cross-link interference), while the first, third and fifth slots may be used for low priority transmissions (and may experience cross-link interference). The absence of cross-link interference may improve the predictability of the link quality during such reserved slots. This may result in better likelihood of decoding the transmission, thereby improving the quality of service. Here, BS 110 may identify the first set of resources as one that includes the particular slot, and may identify the second set of resources as one that includes another slot (e.g., a slot for which no directional coordination is maintained). In some aspects, such slot reservations may be used in, for example, a wireless communication network that operates based at least in part on a dynamic TDD technique.

In some aspects, BS 110 may identify more than two sets of resources, where each is associated with a different transmission priority. For example, BS 110 may identify a first set of resources as being associated with high priority transmissions, a second set of resources as being associated with low priority transmissions, and a third set of resources as being associated with medium priority transmissions.

Returning to FIG. 9A, as shown by reference number 920, BS 110 may signal configuration information, associated with the first set of resources and the second set of resources, to UE 120. In some aspects, the configuration information may include information that identifies the first set of resources, information indicating that the first set of resources is associated with high priority transmissions, information that identifies the second set of resources, and information indicating that the second set of resources is associated with low priority transmissions. As shown, UE 120 may receive the configuration information signaled by BS 110.

In some aspects, BS 110 may signal the configuration information to multiple UEs 120. For example, BS 110 may signal the configuration information in an item of system information, a RRC message, a group-common PDCCH, and/or another type of information that is provided to multiple UEs 120. In such a case, the first set of resources and the second set of resources may be used by any of the multiple UEs 120 (e.g., to transmit UL transmissions or monitor for DL transmissions). In some aspects, such signaling may be semi-static (e.g., such that the configuration information is valid for multiple slots and/or subframes).

Figure 9C:
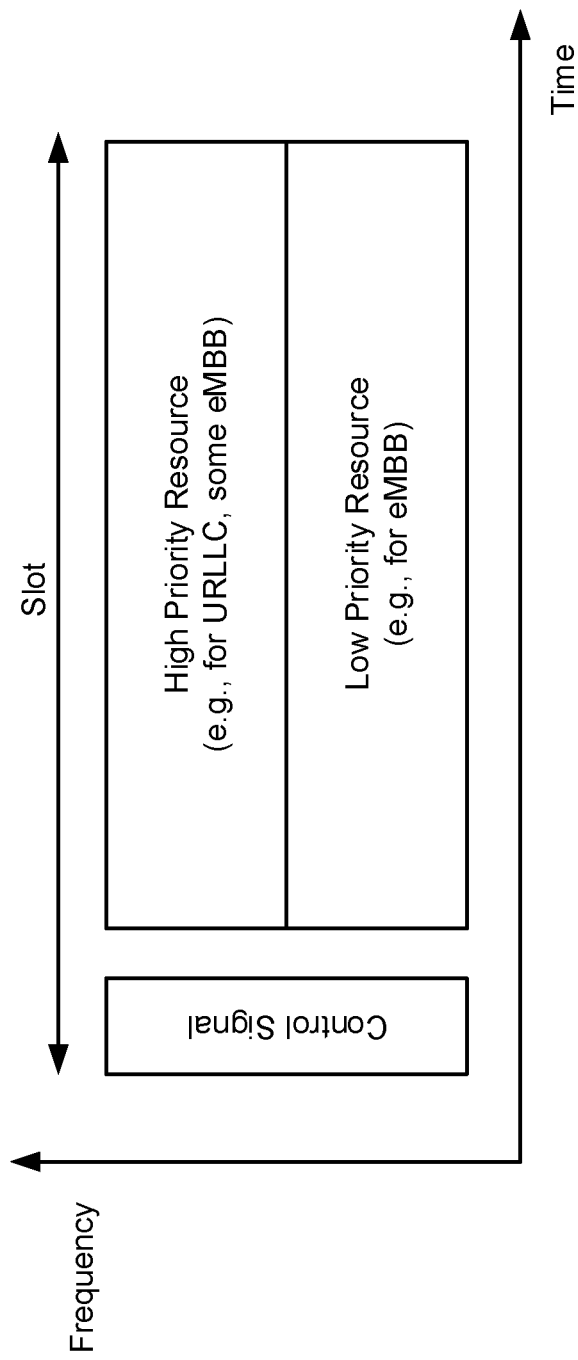
Figure 9D:
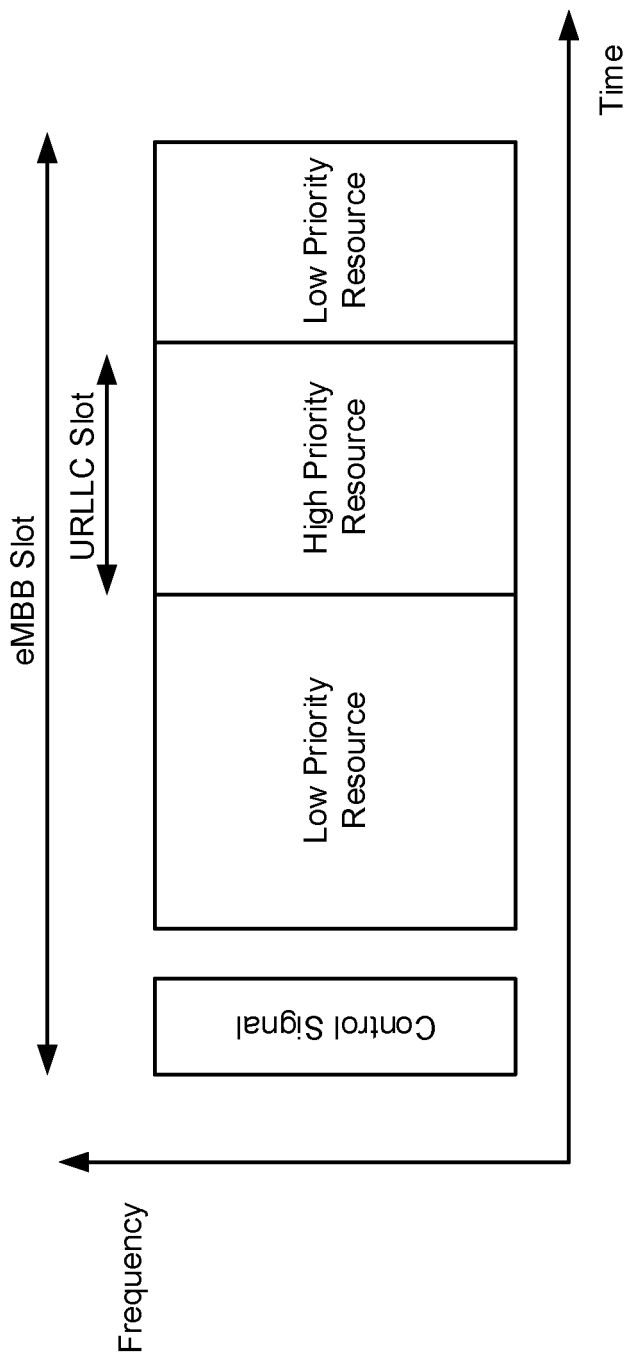

In some aspects, BS 110 may signal the configuration information in a grant to a single UE 120 (e.g., when the first and second sets of resources are allocated to the single UE 120). For example, BS 110 may signal the configuration information in DCI included in a PDCCH portion of a slot that includes the first set of resources and the second set of resources. As a particular example, BS 110 may signal the configuration information in DCI of an eMBB slot PDCCH, where first and second sets of resources (e.g., mini-slots), included in the eMBB slot, may be used for URLLC transmissions. FIGS. 9C and 9D are diagrams illustrating examples of manners in which different portions of a single slot may be used for high priority transmissions (e.g., a URLLC transmission) and low priority transmissions (e.g., an eMBB transmission). In some aspects, such signaling may be dynamic (e.g., such that the configuration information is valid for a particular slot and/or subframe).

Returning to FIG. 9A, as shown by reference number 930, UE 120 may select, based at least in part on the configuration information and a priority of a transmission, either the first set of resources or the second set of resources for transmitting the transmission.

In some aspects, UE 120 may determine the priority of the transmission based at least in part on a priority metric associated with the transmission. The priority metric may include, for example, a packet deadline associated with the transmission (e.g., a deadline defined by a type of service associated with the transmission). In some aspects, UE 120 may determine the packet deadline based at least in part on information included in the packet.

As another example, the priority metric may include a quality of service class associated with the transmission (e.g., a quality of service class to be afforded to the type of service associated with the transmission). In some aspects, UE 120 may determine the quality of service class based at least in part on information, accessible by UE 120, that identifies quality of service classes to be afforded to different transmissions associated with different types of services.

As another example, the priority metric may include a quality of a previous transmission associated with the transmission (e.g., information associated with whether a previous transmission of the packet failed, was successfully decoded, and/or the like). As a particular example, the priority metric may be an effective SINR, associated with the previous transmission. For a transmission in the uplink direction, the effective SINR may be signaled to UE 120 by BS 110, and UE 120 may determine the priority based at least in part on the effective SINR and the modulation and coding scheme (MCS) used for the previous transmission. In this example, if the effective SINR did not satisfy a decoding threshold required for the MCS that was used (e.g., if the effective SINR was less than an SINR needed for decoding the previous transmission by a threshold amount), then the priority of the transmission may be increased (e.g., from low to high) or maintained (e.g., at high or low). However, if the gap between the effective SINR and the SINR required for decoding is within a threshold, then the priority of the transmission may be decreased (e.g., from high to low) or maintained (e.g., at high or low). In some aspects, for an UL transmission by UE 120, BS 110 may determine the priority, associated with the transmission, based at least in part on the effective SINR of the previous transmission, and may signal the priority to UE 120.

In some aspects, UE 120 may determine the priority of the transmission based at least in part on comparing the priority metric and another priority metric associated with another transmission. For example, (e.g., in the case of a grant-based UL transmission), assume that a first transmission and a second transmission are pending at UE 120. Here, UE 120 may compare a first priority metric associated with the first transmission (e.g., a first packet deadline associated with the first transmission), and a second priority metric associated with the second transmission (e.g., a second packet deadline associated with the second transmission). In this example, UE 120 may determine that the first transmission is a high priority transmission and that the second transmission is a low priority transmission when the first packet deadline is sooner than the second packet deadline. Conversely, UE 120 may determine that the second transmission is a high priority transmission and that the first transmission is a low priority transmission when the second packet deadline is sooner than the first packet deadline. In some aspects, UE 120 may determine that either, both, or neither of the first transmission and the second transmission are high priority transmissions based on a comparison of the packet deadline to a threshold.

Additionally, or alternatively, UE 120 may determine the priority of the transmission based at least in part on comparing the priority metric and a threshold configured on UE 120. For example, (e.g., in the case of a grant-free contention-based UL transmission), UE 120 may compare the priority metric associated with the transmission (e.g., a quality of service class), and a threshold for determining the priority of the transmission (e.g., a threshold that identifies a minimum quality of service class required to identify a transmission as a high priority transmission). In this example, UE 120 may determine that the transmission is a high priority transmission when the quality of service class is at or above the threshold minimum quality of service class. Conversely, UE 120 may determine that the transmission is a low priority transmission when the quality of service class is below the threshold minimum quality of service class. In some aspects, use of thresholds for determining the priority of the transmission may facilitate consistent prioritization of transmissions among multiple UEs (e.g., since UE 120 may not have access to information associated with priority metrics for transmissions associated with other UEs 120).

Additionally, or alternatively, UE 120 may determine the priority based at least in part on the type of service associated with the transmission. For example, UE 120 may be configured to determine that URLLC transmissions are high priority transmissions and that eMBB transmissions are low priority transmissions. In some aspects, UE 120 may determine priorities of multiple transmissions that are of the same type of service based at least in part on priority metrics associated with the multiple transmissions, as described above.

Additionally, or alternatively, UE 120 may determine the priority of the transmission based at least in part on information provided by BS 110. For example, BS 110 may determine (e.g., based at least in part on an effective SINR of a previous transmission associated with the transmission, based at least in part on expecting a transmission of a particular service type, and/or the like) the priority of the transmission, and may signal the priority of the transmission to UE 120.

In some aspects, UE 120 may select either the first set of resources or the second set of resources for transmitting the transmission. For example, if UE 120 determines that the transmission is a high priority transmission, then UE 120 may select the first set of resources for transmitting the transmission. As another example, if UE 120 determines that the transmission is a low priority transmission, then UE 120 may select the second set of resources for transmitting the transmission.

In some aspects, UE 120 may select the first set of resources for a first transmission, and may select the second set of resources for a second transmission (e.g., when UE 120 has at least two pending transmissions). For example, UE 120 may select the first set of resources for a pending URLLC transmission, and may select the second set of resources for a pending eMBB transmission.

As shown by reference number 940, UE 120 may transmit the transmission using the selected set of resources. For example, UE 120 may transmit a high priority transmission using the first set of resources. As another example, UE 120 may transmit a low priority transmission using the second set of resources. In some aspects, UE 120 may (e.g., concurrently) transmit a high priority transmission using the first of resources and a low priority transmission using the second set of resources.

In some aspects, BS 110 may monitor the first set of resources and the second set of resources in order to receive the transmission transmitted by UE 120.

As indicated above, FIGS. 9A-9D is provided as examples. Other examples are possible and may differ from what was described with respect to FIGS. 9A-9D.

Figure 10:
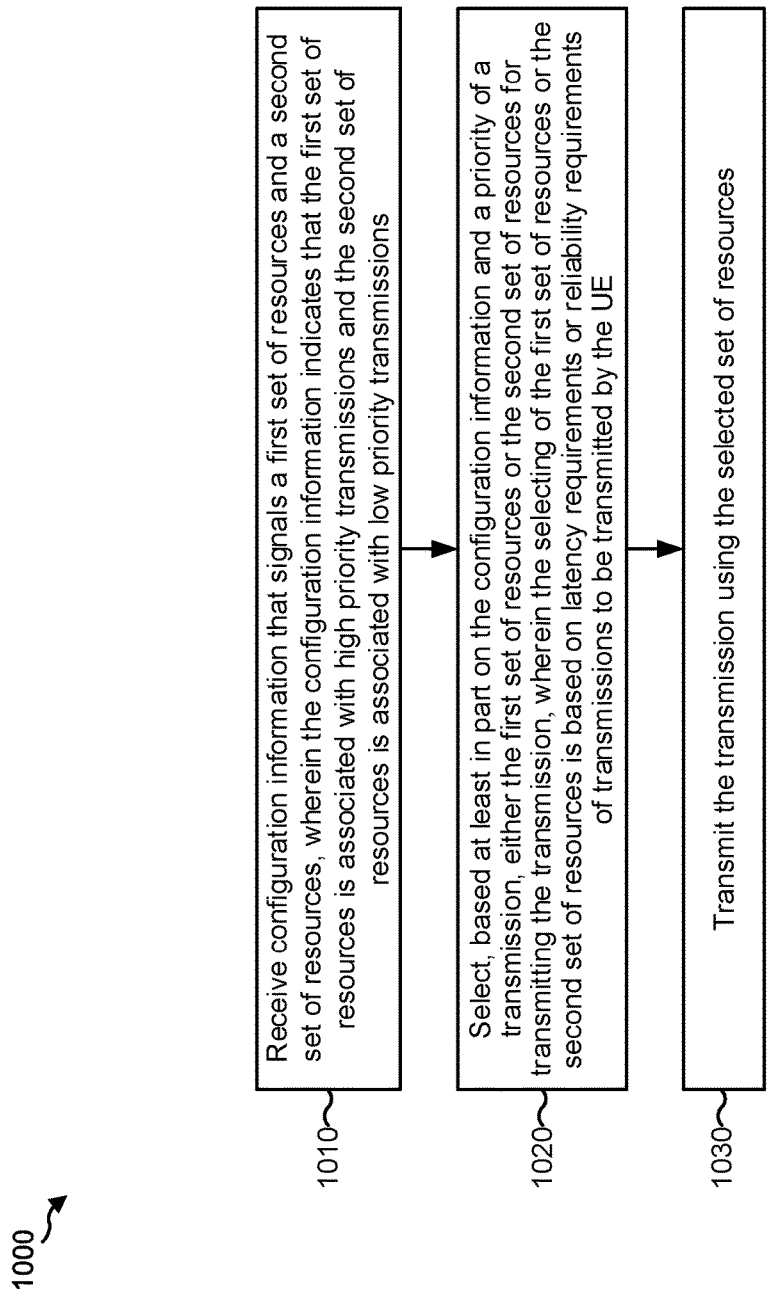
FIG. 10 is a diagram illustrating an example process performed, for example, by a UE, in accordance with various aspects of the present disclosure.

FIG. 10 is a diagram illustrating an example process 1000 performed, for example, by a UE, in accordance with various aspects of the present disclosure.

As shown in FIG. 10, in some aspects, process 1000 may include receiving configuration information that signals a first set of resources and a second set of resources, wherein the configuration information indicates that the first set of resources is associated with high priority transmissions and the second set of resources is associated with low priority transmissions (block 1010). For example, UE 120 may receive such configuration information, as described above.

As further shown in FIG. 10, in some aspects, process 1000 may include selecting, based at least in part on the configuration information and a priority of a transmission, either the first set of resources or the second set of resources for transmitting the transmission, wherein the selecting of the first set of resources or the second set of resources is based on latency requirements or reliability requirements of transmissions to be transmitted by the UE (block 1020). For example, UE 120 may select, based at least in part on the configuration information and a priority of a transmission, either the first set of resources or the second set of resources for transmitting the transmission, wherein the selecting of the first set of resources or the second set of resources is based on latency requirements or reliability requirements of transmissions to be transmitted by the UE, as described above.

As further shown in FIG. 10, in some aspects, process 1000 may include transmitting the transmission using the selected set of resources (block 1030). For example, UE 120 may transmit the transmission using the selected set of resources (i.e., the first set of resources or the second set of resources), as described above.

In some aspects, the first set of resources comprises one or more resources having a same link direction across a plurality of cells, and the second set of resources comprises one or more resources having a potentially different link direction across the plurality of cells.

In some aspects, the transmission is an ultra-reliable low-latency (URLLC) transmission and another transmission, of the transmissions to be transmitted by the UE, is an enhanced mobile broadband (eMBB) transmission.

In some aspects, the transmission is a first ultra-reliable low-latency (URLLC) transmission and another transmission, of the transmissions to be transmitted by the UE, is a second URLLC transmission, wherein a time remaining until a deadline, associated with the first URLLC transmission, is less than a time remaining until a deadline associated with the second URLLC transmission.

In some aspects, the configuration information is commonly signaled to multiple UEs including UE 120. In some aspects, the configuration information is semi-statically signaled in at least one of an item of system information, a radio resource control message, or a group-common physical downlink control channel.

In some aspects, the first set of resources and the second set of resources are granted for use by UE 120 in a grant (e.g., granted at the same time, granted in a common grant, and/or the like). In some aspects, the configuration information is dynamically signaled in downlink control information included in a physical downlink control channel portion of a slot that includes the first set of resources and the second set of resources.

In some aspects, the first set of resources includes at least one of a set of resources blocks; a code division multiple access spreading code; a transmit power level, a MIMO spatial layer, beam, or port; a set of symbols, a set of slots, or a combination thereof.

In some aspects, the priority of the transmission is based at least in part on at least one of a threshold configured on UE 120 or a priority indication, associated with the transmission, provided by a base station.

In some aspects, the priority of the transmission is based at least in part on a priority metric associated with the transmission. In some aspects, the priority metric includes at least one of a packet deadline associated with the transmission, a quality of service class associated with the transmission, or a quality of a previous transmission associated with the transmission. In some aspects, UE 120 may compare the priority metric and a priority metric, associated with another transmission to be transmitted by the UE 120, and may determine the priority of the transmission based at least in part on the comparison. In some aspects, UE 120 may compare the priority metric and a threshold associated with the priority metric, and may determine the priority of the transmission based at least in part on comparing the priority metric and the threshold.

In some aspects, the first set of resources are higher quality resources than the second set of resources based at least in part on access to the first set of resources being more limited as compared to access to the second set of resources. For example, the first set of resources may be higher quality resources than the second set of resources based at least in part on limiting a number of transmissions that use the first set of resources as compared to the second set of resources.

In some aspects, UE 120 may be configured to use a first power control target set point when transmitting using the first set of resources and a second power control target set point when transmitting using the second set of resources, wherein the first power control target set point is higher than the second power control target set point.

In some aspects, the first set of resources are higher quality resources than the second set of resources based at least in part on an allocation, among a plurality of cells, of a particular frequency band for use by the first set of resources.

In some aspects, the first set of resources are higher quality resources than the second set of resources based at least in part on a reservation of a slot, including the first set of resources, as a slot used for transmissions in a particular direction, commonly across a plurality of cells.

In some aspects, the first set of resources comprises one or more slots having a same link direction across a plurality of cells.

In some aspects, the selected set of resources is the first set of resources and the transmission is a first transmission, and a second transmission is transmitted using the second set of resources. In some aspects, the first transmission is a first URLLC transmission and the second transmission is eMBB transmission or a second URLLC transmission.

In some aspects, the first set of resources are higher quality resources than the second set of resources.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
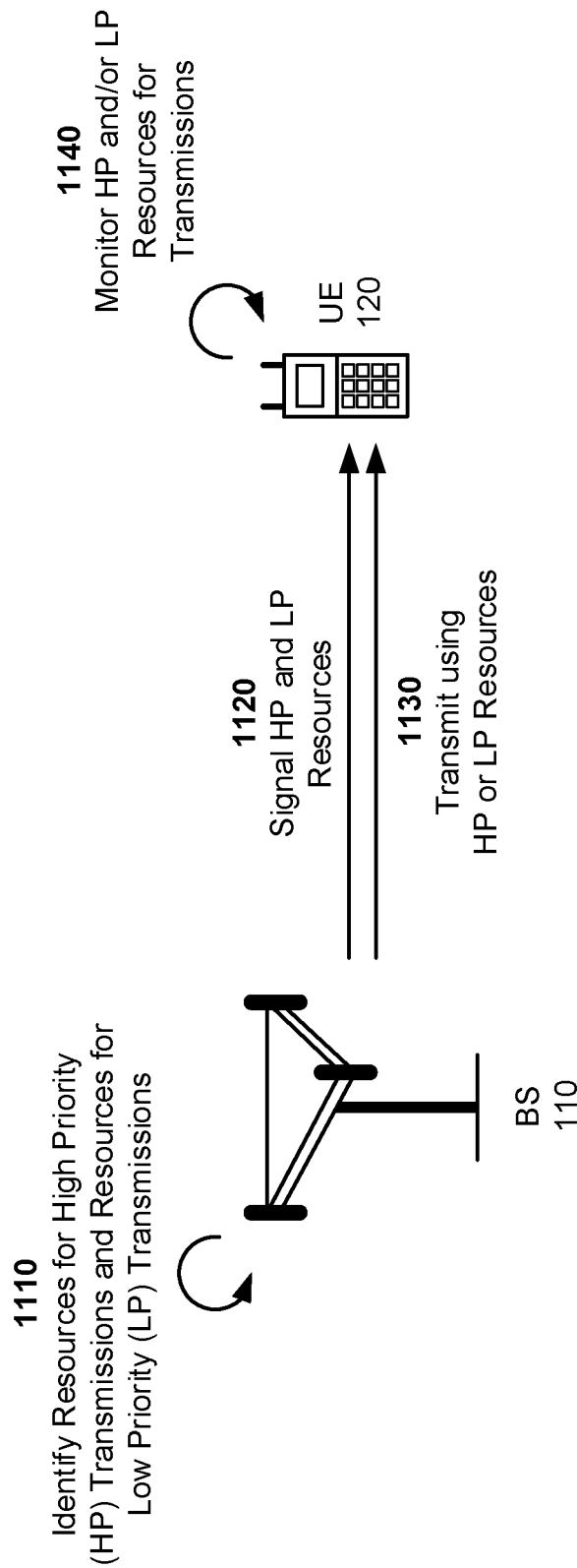
FIG. 11 is a diagram illustrating an example of a UE monitoring a first set of resources, associated with high priority transmissions, and/or a second set of resources associated with low priority transmissions, in accordance with various aspects of the present disclosure.

FIG. 11 is a diagram illustrating an example 1100 of UE 120 monitoring a first set of resources, associated with high priority transmissions, and/or a second set of resources associated with low priority transmissions, in accordance with various aspects of the present disclosure.

As shown in FIG. 11, and by reference number 1110, BS 110 may identify a first set of resources, associated with high priority transmissions, and a second set of resources associated with low priority transmissions. In some aspects, BS 110 may identify the first and second sets of resources in manner similar to that described above with regard to reference number 910 of FIG. 9A.

As shown by reference number 1120, BS 110 may signal configuration information, associated with the first set of resources and the second set of resources, to UE 120. In some aspects, BS 110 may signal the first and second sets of resources in a manner similar to that described above with regard to reference number 920 of FIG. 9A. As shown, UE 120 may receive the configuration information signaled by BS 110.

As shown by reference number 1130, BS 110 may transmit a transmission using the first set of resources or the second set of resources. In some aspects, BS 110 may transmit the transmission in the first set of resources or the second set of resources on a priority of the transmission. In some implementations, a transmit power, associated with the transmission by BS 110, may be based at least in part on the set of resources associated with the transmission. For example, BS 110 may use a higher transmit power for a transmission in the first set of resources, and may use a lower transmit power for a transmission in the second set of resources.

In some aspects, BS 110 may determine the priority of the transmission in a manner similar to that of UE 120, as described above with regard to reference number 930 of FIG. 9A. For example, BS 110 may determine the priority of the transmission based at least in part on a priority metric associated with the transmission, a type of service associated with the transmission, based at least in part on comparing priority metrics of multiple pending DL transmissions, and/ or the like. In some aspects, BS 110 may (e.g., concurrently) transmit a high priority transmission using the first set of resources and a low priority transmission using the second set of resources.

As shown by reference number 1140, UE 120 may, based at least in part on the configuration information, monitor the first set of resources and the second set of resources in order to receive a high priority transmission or a low priority transmission on the first set of resources and/or the second set of resources, respectively.

In some aspects, UE 120 may monitor both the first set of resources and the second set of resources. Alternatively, UE 120 may selectively monitor the first set of resources or the second set of resources. For example, if UE 120 expects to receive only a URLLC transmission in a given slot (e.g., when UE 120 is awaiting a response to a previous URLLC transmission), then UE 120 may monitor only the first set of resources (e.g., when the network is configured such that URLLC transmissions are always high priority transmissions). As another alternative, the configuration information may specify or define the resource sets, UE 120 may monitor a control channel for a resource grant, and the resource grant may indicate the configured resource set(s) which convey downlink data for UE 120 120. In one example, as previously described, the resource grant could include DCI which indicates the applicable resource set(s) in relation to a previously established upper layer configuration.

As indicated above, FIG. 11 is provided as an example. Other examples are possible and may differ from what was described with respect to FIG. 11.

Figure 12:
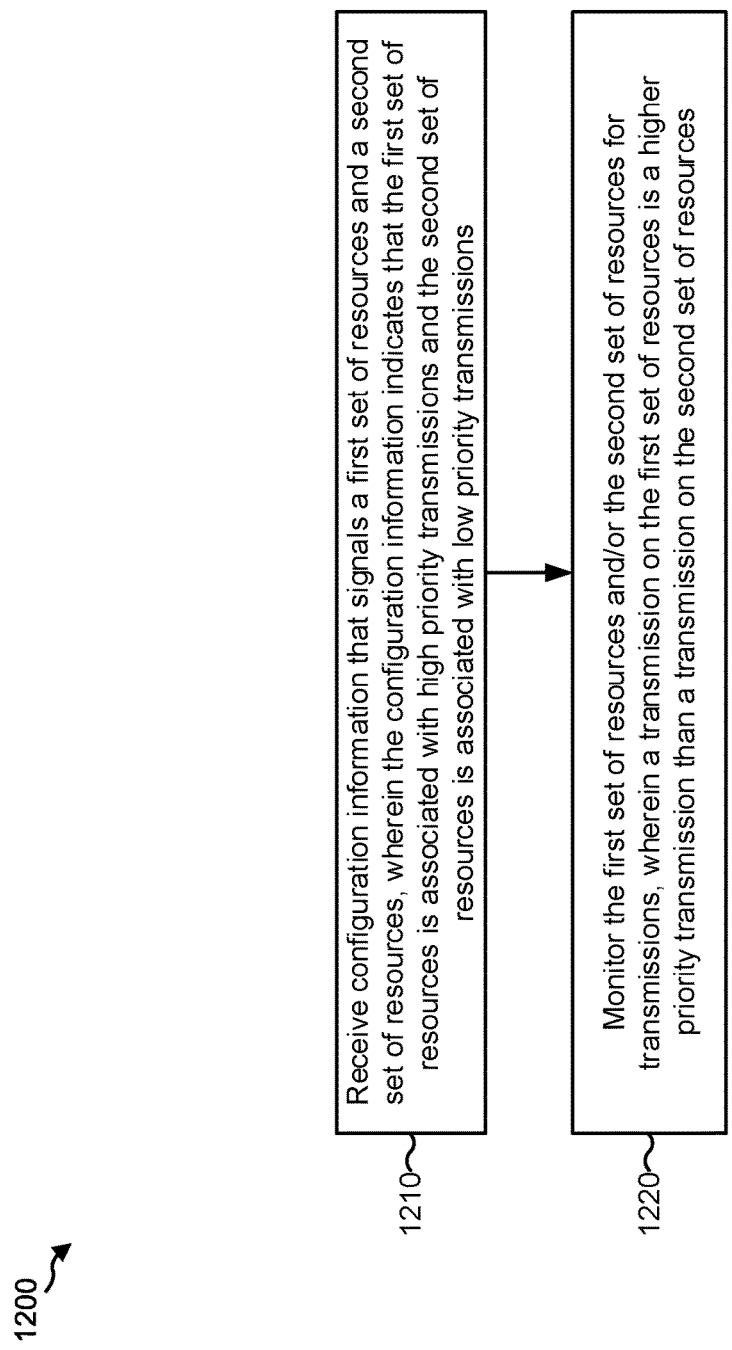
FIG. 12 is a diagram illustrating an example process performed, for example, by a UE, in accordance with various aspects of the present disclosure.

FIG. 12 is a diagram illustrating an example process 1200 performed, for example, by a UE, in accordance with various aspects of the present disclosure.

As shown in FIG. 12, in some aspects, process 1200 may include receiving configuration information that signals a first set of resources and a second set of resources, wherein the configuration information indicates that the first set of resources is associated with high priority transmissions and that the second set of resources is associated with low priority transmissions (block 1210). For example, UE 120 may receive such configuration information, as described above.

As further shown in FIG. 12, in some aspects, process 1200 may include monitoring the first set of resources and/or the second set of resources for transmissions, wherein a transmission on the first set of resources is a higher priority transmission than a transmission on the second set of resources (block 1220). For example, UE 120 may monitor the first set of resources and/or the second set of resources for transmissions, wherein a transmission on the first set of resources is a higher priority transmission than a transmission on the second set of resources, as described above.

In some aspects, the configuration information is commonly signaled to multiple UEs including UE 120. In some aspects, the configuration information is semi-statically signaled in at least one of an item of system information, a radio resource control message, or a group-common physical downlink control channel.

In some aspects, the first set of resources and the second set of resources are granted for use by UE 120 in a grant. In some aspects, the configuration information is dynamically signaled in downlink control information included in a physical downlink control channel portion of a slot that includes the first set of resources and the second set of resources.

In some aspects, the first set of resources includes at least one of a set of resources blocks; a code division multiple access code; a transmit power level; a MIMO spatial layer, beam, or port; a set of symbols; a set of slots, or a combination thereof.

In some aspects, the first set of resources are higher quality resources than the second set of resources based at least in part on access to the first set of resources being more limited as compared to access to the second set of resources. For example, the first set of resources may be higher quality resources than the second set of resources based at least in part on limiting a number of transmissions that use the first set of resources as compared to the second set of resources.

In some aspects, the first set of resources are higher quality resources than the second set of resources based at least in part on an allocation, among a plurality of cells, of a particular frequency band for use by the first set of resources.

In some aspects, the first set of resources are higher quality resources than the second set of resources based at least in part on a reservation of a slot, including the first set of resources, as a slot used for transmissions in an particular direction, commonly across a plurality of cells.

In some aspects, the first set of resources comprises one or more slots having a same link direction across a plurality of cells.

In some aspects, the transmission on the first set of resources is a first URLLC transmission and the transmission on the second set of resource is an eMBB transmission or a second URLLC transmission.

In some aspects, the first set of resources are higher quality resources than the second set of resources.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
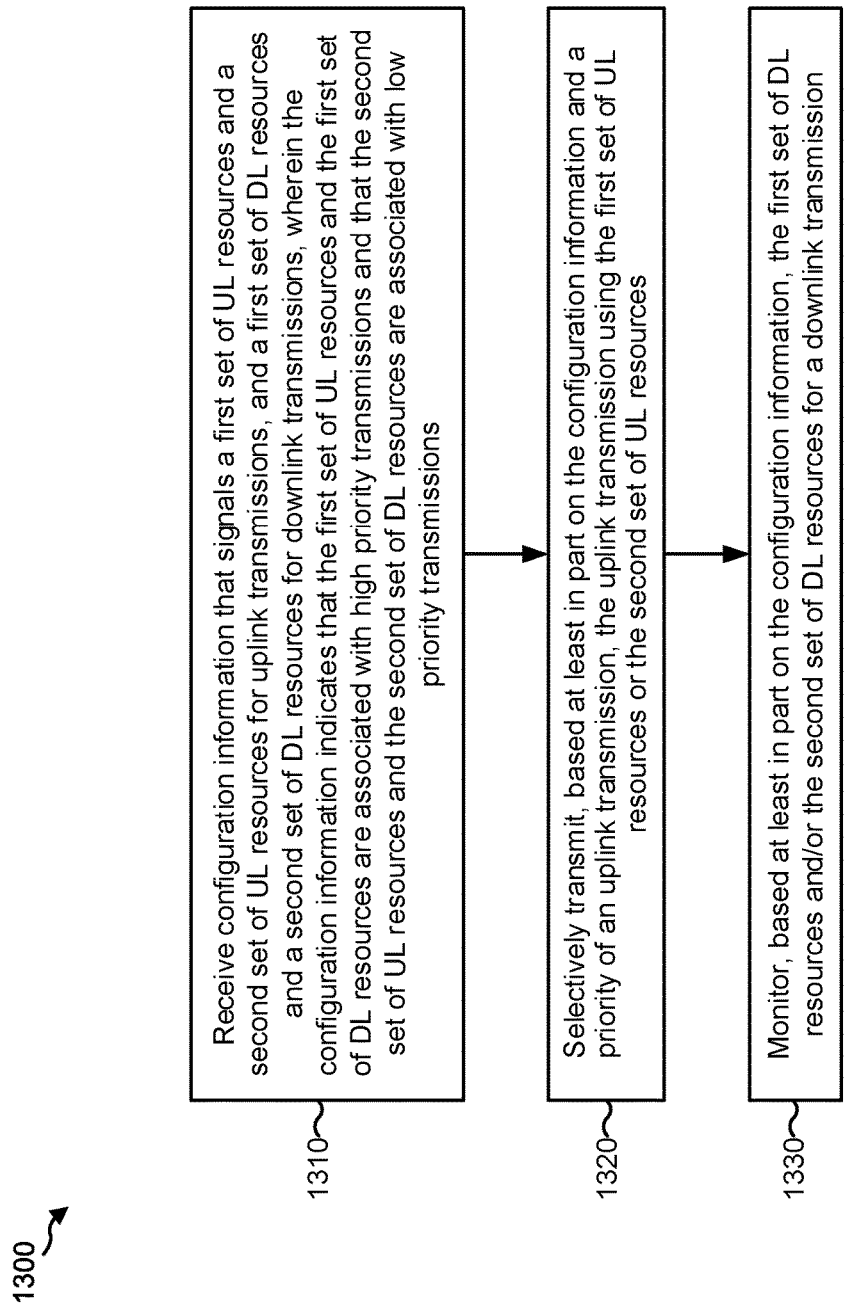
FIG. 13 is a diagram illustrating an example process performed, for example, by a UE, in accordance with various aspects of the present disclosure.

FIG. 13 is a diagram illustrating an example process 1300 performed, for example, by a UE, in accordance with various aspects of the present disclosure. Example process 1300 illustrates an example process by which UE 120 may (e.g., concurrently) perform operations As shown in FIG. 13, in some aspects, process 1300 may include receiving configuration information that signals a first set of UL resources and a second set of UL resources for uplink transmissions, and a first set of DL resources and a second set of DL resources for downlink transmissions, wherein the configuration information indicates that the first set of UL resources and the first set of DL resources are associated with high priority transmissions and that the second set of UL resources and the second set of DL resources are associated with low priority transmissions (block 1310). For example, UE 120 may receive such configuration information, as described above.

As further shown in FIG. 13, in some aspects, process 1300 may include selectively transmitting, based at least in part on the configuration information and a priority of an uplink transmission, the uplink transmission using the first set of UL resources or the second set of UL resources (block 1320). For example, UE 120 may selectively transmit, based at least in part on the configuration information and a priority of an uplink transmission, the uplink transmission using the first set of UL resources or the second set of UL resources, as described above.

As further shown in FIG. 13, in some aspects, process 1300 may include monitoring, based at least in part on the configuration information, the first set of DL resources and/or the second set of DL resources for a downlink transmission (block 1330). For example, UE 120 may monitor, based at least in part on the configuration information, the first set of DL resources and/or the second set of DL resources for a downlink transmission, as described above.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based at least in part on" is intended to mean "based, at least in part, on" unless explicitly stated otherwise.

What is claimed is:

1. A method for wireless communication performed by a user equipment (UE), comprising:
   receiving configuration information that signals a first set of resources and a second set of resources,
      wherein the configuration information indicates that the first set of resources is associated with high priority transmissions and the second set of resources is associated with low priority transmissions, and
      wherein the first set of resources comprises one or more slots reserved for transmissions in one link direction across a plurality of cells, and the second set of resources comprises one or more slots that are not reserved for transmissions in any one link direction across the plurality of cells;
   selecting, based at least in part on the configuration information and a priority of a transmission, either the first set of resources or the second set of resources for transmitting the transmission,
      wherein the selecting of the first set of resources or the second set of resources is based on latency requirements or reliability requirements of transmissions to be transmitted by the UE; and
   transmitting the transmission using the selected set of resources.

2. The method of claim 1, wherein the transmission is an ultra-reliable low-latency (URLLC) transmission and another transmission, of the transmissions to be transmitted by the UE, is an enhanced mobile broadband (eMBB) transmission.

3. The method of claim 1, wherein the transmission is a first ultra-reliable low-latency (URLLC) transmission and another transmission, of the transmissions to be transmitted by the UE, is a second URLLC transmission,
   wherein a time remaining until a deadline, associated with the first URLLC transmission, is less than a time remaining until a deadline associated with the second URLLC transmission.

4. The method of claim 1, wherein the configuration information is commonly signaled to multiple UEs including the UE.

5. The method of claim 4, wherein the configuration information is semi-statically signaled in at least one of:
   an item of system information,
   a radio resource control message, or
   a group-common physical downlink control information.

6. The method of claim 1, wherein the first set of resources and the second set of resources are granted at the same time for use by the UE, or in a common grant to the UE and at least one other UE.

7. The method of claim 6, wherein the configuration information is dynamically signaled in downlink control information included in a physical downlink control channel portion of a slot that includes the first set of resources and the second set of resources.

8. The method of claim 1, wherein the first set of resources includes at least one of:
   a set of resources blocks,
   a code division multiple access spreading code,
   a transmit power level,
   a multiple-input, multiple-output (MIMO) spatial layer, beam, or port,
   a set of symbols,
   a set of slots, or
   a combination thereof.

9. The method of claim 1, wherein the priority of the transmission is based at least in part on at least one of a threshold configured on the UE or a priority indication, associated with the transmission, provided by a base station.

10. The method of claim 1, wherein the priority of the transmission is based at least in part on a priority metric associated with at least one of:
    a packet deadline associated with the transmission,
    a quality of service class associated with the transmission, or
    a quality of a previous transmission associated with the transmission.

11. The method of claim 10, further comprising:
    comparing the priority metric and another priority metric associated with another transmission to be transmitted by the UE; and
    determining the priority of the transmission based at least in part on comparing the priority metric and the other priority metric.

12. The method of claim 10, further comprising:
    comparing the priority metric and a threshold associated with the priority metric; and
    determining the priority of the transmission based at least in part on comparing the priority metric and the threshold.

13. The method of claim 1, wherein the first set of resources are higher quality resources than the second set of resources based at least in part on limiting a number of transmissions that use the first set of resources as compared to the second set of resources.

14. The method of claim 1, wherein the UE is configured to use a first power control target set point when transmitting using the first set of resources and a second power control target set point when transmitting using the second set of resources,
wherein the first power control target set point is higher than the second power control target set point.

15. The method of claim 1, wherein the first set of resources are higher quality resources than the second set of resources based at least in part on an allocation, among a plurality of cells, of a particular frequency band or a portion thereof for use by the first set of resources.

16. The method of claim 1, wherein the selected set of resources is the first set of resources and the transmission is a first transmission, and
wherein a second transmission, of the transmissions to be transmitted by the UE, is transmitted using the second set of resources.

17. The method of claim 1, wherein the first set of resources are higher quality resources than the second set of resources.

18. The method of claim 1, wherein the one or more slots, of the first set of resources, include a first slot reserved for transmissions in an uplink direction and a second slot reserved for transmissions in a downlink direction.

19. A user equipment (UE) for wireless communication, comprising:
memory; and
one or more processors coupled to the memory, the memory and the one or more processors configured to:
receive configuration information that signals a first set of resources and a second set of resources,
wherein the configuration information indicates that the first set of resources is associated with high priority transmissions and the second set of resources is associated with low priority transmissions, and
wherein the first set of resources comprises one or more slots reserved for transmissions in one link direction across a plurality of cells, and the second set of resources comprises one or more slots that are not reserved for transmissions in any one link direction across the plurality of cells;
select, based at least in part on the configuration information and a priority of a transmission, either the first set of resources or the second set of resources for transmitting the transmission,
wherein the selecting of the first set of resources or the second set of resources is based on latency requirements or reliability requirements of transmissions to be transmitted by the UE; and
transmit the transmission using the selected set of resources.

20. The UE of claim 19, wherein the transmission is an ultra-reliable low-latency (URLLC) transmission and another transmission, of the transmissions to be transmitted by the UE, is an enhanced mobile broadband (eMBB) transmission.

21. The UE of claim 19, wherein the transmission is a first ultra-reliable low-latency (URLLC) transmission and another transmission, of the transmissions to be transmitted by the UE, is a second URLLC transmission,
wherein a time remaining until a deadline, associated with the first URLLC transmission, is less than a time remaining until a deadline associated with the second URLLC transmission.

22. The UE of claim 19, wherein the one or more slots, of the first set of resources, include a first slot reserved for transmissions in an uplink direction and a second slot reserved for transmissions in a downlink direction.

23. A non-transitory computer-readable medium storing instructions for wireless communication, the instructions comprising:
one or more instructions that, when executed by one or more processors of a user equipment (UE), cause the one or more processors to:
receive configuration information that signals a first set of resources and a second set of resources,
wherein the configuration information indicates that the first set of resources is associated with high priority transmissions and the second set of resources is associated with low priority transmissions, and
wherein the first set of resources comprises one or more slots reserved for transmissions in one link direction across a plurality of cells, and the second set of resources comprises one or more slots that are not reserved for transmissions in any one link direction across the plurality of cells;
select, based at least in part on the configuration information and a priority of a transmission, either the first set of resources or the second set of resources for transmitting the transmission,
wherein the selecting of the first set of resources or the second set of resources is based on latency requirements or reliability requirements of transmissions to be transmitted by the UE; and
transmit the transmission using the selected set of resources.

24. The non-transitory computer-readable medium of claim 23, wherein the transmission is an ultra-reliable low-latency (URLLC) transmission and another transmission, of the transmissions to be transmitted by the UE, is an enhanced mobile broadband (eMBB) transmission.

25. The non-transitory computer-readable medium of claim 23, wherein the transmission is a first ultra-reliable low-latency (URLLC) transmission and another transmission, of the transmissions to be transmitted by the UE, is a second URLLC transmission,
wherein a time remaining until a deadline, associated with the first URLLC transmission, is less than a time remaining until a deadline associated with the second URLLC transmission.

26. The non-transitory computer-readable medium of claim 23, wherein the one or more slots, of the first set of resources, include a first slot reserved for transmissions in an uplink direction and a second slot reserved for transmissions in a downlink direction.

27. An apparatus for wireless communication, comprising:
means for receiving configuration information that signals a first set of resources and a second set of resources,
wherein the configuration information indicates that the first set of resources is associated with high priority transmissions and the second set of resources is associated with low priority transmissions, and
wherein the first set of resources comprises one or more slots reserved for transmissions in one link direction across a plurality of cells, and the second set of resources comprises one or more slots that are not reserved for transmissions in any one link direction across the plurality of cells;

means for selecting, based at least in part on the configuration information and a priority of a transmission, either the first set of resources or the second set of resources for transmitting the transmission, wherein the selecting of the first set of resources or the second set of resources is based on latency requirements or reliability requirements of transmissions to be transmitted by the apparatus; and means for transmitting the transmission using the selected set of resources.

28. The apparatus of claim 27, wherein the transmission is an ultra-reliable low-latency (URLLC) transmission and another transmission, of the transmissions to be transmitted by the apparatus, is an enhanced mobile broadband (eMBB) transmission.

29. The apparatus of claim 27, wherein the transmission is a first ultra-reliable low-latency (URLLC) transmission and another transmission, of the transmissions to be transmitted by the apparatus, is a second URLLC transmission, wherein a time remaining until a deadline, associated with the first URLLC transmission, is less than a time remaining until a deadline associated with the second URLLC transmission.

30. The apparatus of claim 27, wherein the one or more slots, of the first set of resources, include a first slot reserved for transmissions in an uplink direction and a second slot reserved for transmissions in a downlink direction.

* * * * *